United States Patent [19]

Paul

[11] Patent Number: 4,899,672
[45] Date of Patent: Feb. 13, 1990

[54] METHOD AND ARRANGEMENT FOR SOWING INDIVIDUAL SEEDS IN A FURROW MADE BY A PLOUGHSHARE

[76] Inventor: Karl-Heinz Paul, Zur Wilde 8, 3590 Bad Wildungen-Wega, Fed. Rep. of Germany

[21] Appl. No.: 116,628

[22] Filed: Nov. 3, 1987

[30] Foreign Application Priority Data

Nov. 4, 1986 [DE] Fed. Rep. of Germany ....... 3637530

[51] Int. Cl.⁴ ............................................. A01C 7/20
[52] U.S. Cl. .................................... 111/174; 221/278; 111/170
[58] Field of Search ........................... 111/6, 7, 10–13, 111/34, 51, 77; 221/278; 406/85, 196, 154

[56] References Cited

U.S. PATENT DOCUMENTS

| | | | |
|---|---|---|---|
| 1,308,464 | 7/1919 | Westly | 406/85 |
| 3,653,550 | 4/1972 | Williams | 111/6 |
| 4,399,757 | 8/1983 | Maury | 111/77 X |
| 4,516,690 | 5/1985 | Andersson | 221/278 |
| 4,632,284 | 12/1986 | Erazo et al. | 111/7 X |

FOREIGN PATENT DOCUMENTS

| | | | |
|---|---|---|---|
| 925509 | 9/1947 | France | 111/77 |
| 438384 | 1/1975 | U.S.S.R. | 111/6 |
| 451420 | 12/1975 | U.S.S.R. | 111/77 |
| 581900 | 11/1977 | U.S.S.R. | 111/77 |
| 660614 | 5/1979 | U.S.S.R. | 111/6 |
| 1136771 | 12/1968 | United Kingdom | 111/34 |
| 2041898 | 9/1980 | United Kingdom | 111/6 |

*Primary Examiner*—Danton D. DeMille
*Attorney, Agent, or Firm*—Max Fogiel

[57] ABSTRACT

In the case of a method for sowing separate seeds in a furrow made by a ploughshare, the separate seeds run in a guide-device, are trapped in the vicinity of the ploughshare, are stored intermediately for a short time and are then released into the furrow. Upon being trapped, the individual seeds are stored intermediately spot-wise in relation to an axis corresponding to the direction of release and under a centering action. The individual seeds are accelerated, by a brief fluid-pulse in the direction of release, from the stationary intermediate storage position and are released into the furrow.

9 Claims, 3 Drawing Sheets

METHOD AND ARRANGEMENT FOR SOWING INDIVIDUAL SEEDS IN A FURROW MADE BY A PLOUGHSHARE

The invention relates to a method for sowing separate seeds in a furrow made by a ploughshare, in which the individual seeds run in a guide-device, are trapped in the vicinity of the ploughshare, are stored intermediately for a short time and are then released into the furrow. At the same time, the invention shows a sowing device with a device for separating the seeds, a guide-device and a ploughshare, a device for trapping the seeds moving in the guide-device, and for depositing them in the furrow made by the ploughshare being provided in the ploughshare near the end of the said guide-device.

A method and an apparatus of the type described at the beginning hereof are known from U.S. Pat. No. 3,303,801. In this case, the seeds pass from a separating device into a guide-device in the form of a downpipe in which they move downwardly. Arranged under the end of the downpipe is a device for trapping the moving seeds, the device consisting essentially of a collecting channel bent into the shape of a V with which a stationary stripper is associated. The V-shaped collecting channel is arranged to move back and forth in time with the stripper and is driven in synchronism with the separating device. The collecting channel remains under the end of the guide-device until at least two seeds are trapped and stored intermediately. As a result of the relative movement between the collecting channel and the stripper, these seeds are released to drop into the furrow. Seeds are then dropped into the furrow in free fall. Since the V-shaped collecting channel is open upwardly and forwardly, there is a danger of the seeds bouncing when they strike the channel or seeds already in it, i.e. of the seeds falling at the side of the channel at an unwanted moment, leading to a minimum of seeds in the furrow and to bounced seeds being deposited anywhere between adjacent furrows. When seeds are deposited in free fall, there is also a danger that they may roll in the furrow. Seeds reaching the collecting channel are usually deposited consecutively in free fall, in such a manner that individual seeds have a forward component of motion in the direction of travel, corresponding to the speed of the sowing machine. In this case, the device for trapping and storing the seeds intermediately is of purely mechanical design, so that corresponding wear and contamination problems may arise.

EU Patent No. 37,775,775 discloses a sowing device comprising a perforated disc on which the seeds are separated pneumatically be negative pressure. Provided at a transfer station for the separated seeds is a venturi-tube containing an aperture for the entry of seeds from the perforated disc into the venturi-tube and which is connected to a source of compressed air. The angle of the axis of the venturi-tube can be adapted to the speed at which the sowing machine is travelling in such a manner that individual seeds are accelerated vertically downwardly by the compressed air and are thus deposited. There is no intermediate storage of the seed after the perforated disc. Individual seeds are thus accelerated from a comparatively great height. When individual seeds pass from the perforated disc into the venture-tube irregularities may occur, in that the seeds are released from the holes at different times. Furthermore, the seeds arrive anyhow in the flow of air forced out of the venturi-tube. The different velocity of the flow of air has a different effect upon the seeds, depending upon whether they reach the axis of the venturi-tube or move more towards the edge areas. All of this affects the positioning of the seeds, i.e. the distance between individual seeds in a row, but this is also dependent to a large degree upon accurate operation of the separating device.

British Patent No. 937,519 discloses a method for sowing separate seeds in an apparatus in which the seeds are first separated in a cellular wheel and are then passed separately and consecutively to a guide-device in the form of an obliquely arranged downpipe which opens into a funnel-shaped part and continues as an additional section of downpipe. A continuous or pulsating flow of air is introduced into this funnel-shaped part, in order to provide additional acceleration to the seeds spaced apart in the downpipe. Errors or irregularities in the separating device, and different distances travelled in the downpipe as a result of non-uniform friction, are only aggravated by the compressed-air acceleration. Positioning of the seeds, i.e. maintaining the distance between them, is therefore mainly dependent upon correct operation of the separating device and upon subsequent factors, e.g. friction in the downpipe.

British Patent No. 593,983 discloses a device having a suction- and blowing-head moving cyclically along an elliptical path on a goose-neck, an opening in this suction-head plunging into a seed-storage, sucking up a single seed, delivering it during its upward movement and releasing it at the top through the opening in a downpipe. During this movement, the suction-flow is transformed alternatingly into a pressure-flow, this being accomplished by means of a bellows. This is therefore merely another kind of separating device whence the separated seeds are released into a guide-device, i.e. a downpipe. The seeds fall through the guide-device in accordance with the operating accuracy of the separating device.

German OS No. 31 44 703 discloses a single-seed apparatus comprising a star-wheel in which a guide-channel accommodating the seeds is provided in the walls of the star-wheel, and/or in the housing thereof for the purpose of guiding and centering the passing seeds. Although this guide-channel provides a centering action, it is accomplished in the vicinity of the separating device, whence individual seeds reach the furrow in free fall.

German OS No. 27 11 464 discloses an apparatus for separating and sowing seeds which are offered in a suspension or are conditioned. Individual seeds are held, in the vicinity of the separating device, by a suction-flow, in front of a nozzle, until the remaining seeds have floated away. This seed is then released, by two flow-pulses directed at right angles to each other, into a guide-device running downwardly, whence it passes directly to the furrow.

It is an object of the present invention, in the case of a method and an apparatus of the type described at the beginning hereof, to improve the positioning of individual seeds in relation to each other, so that they are more accurately spaced from each other in the row. This in intended to optimize spacing and, by adapting to the conditions of the particular type of seed, to achieve an increase in yield.

In the case of the method described at the beginning hereof, this is accomplished, according to the invention, in that the seeds, upon being trapped, are stored intermediately spot-wise in relation to an axis corresponding to the direction of release and under a centering action; and in that the individual seeds are accelerated by a brief fluid-pulse, in the direction of release from the stationary intermediate storage position and are released into the furrow. It is important, in the first place, that the individual seed, i.e. only one seed, be stored intermediately and centered, always spot-wise in relation to an axis corresponding to the direction of release. The individual seed thus always comes to rest in the same place and this place is located spot-wise, not linewise. By intermediate triggering of a brief fluid-pulse, with air and/or a liquid, the individual seed is always accelerated away from the same place in the same way and is released into the furrow. Since the position at which the seed comes to rest is comparatively deep, more particularly in the interior of the share, it does not fall, or is not ejected from a great height. Furthermore, not only gravity, but also the intermittent fluid-pulse acts, over this short distance, upon the individual seed, so that it is accelerated into the furrow. This brings about improved embedding of the individual seed at the point of impingement upon the soil, together with the advantage of a better connection to the capillary system for moisture from the soil. This is particularly so if the fluid used is water, a nutrient solution or the like. Another advantage is that the distance between the seeds is no longer dependent upon the operating accuracy of the separating device. The pressure of the fluid is adjustable and is adapted to the type of seed. The time during which the brief fluid-pulse acts may also be made adjustable, thus making it possible to establish the correct amount of a nutrient- or fertilizer-solution for the individual seed.

The fluid used may be air. The advantage of this is that it does not have to be kept in special containers, but is available in almost unlimited amounts. However, it is also possible to use a liquid as the fluid. Apart from water, this may also contain a nutrient solution, a mordant, protection against weeds or pests, an inoculant, a fertilizer, germination promoters and germination inhibitors. Rhizobeegerm may be used as the inoculant, for example. Germination promoters and germination inhibitors may be desirable for general use in different sowing units of the same kind if seeds of two different kinds are to be sown since it is then a matter of maintaining the sowing pattern of seeds and plants in relation to each other and of influencing growth and harvest conditions by encouraging or retarding germination. If a jet of liquid is used as the fluid-pulse, individual seeds are embedded in a compacted base ensuring that the capillary system makes more moisture available for soaking and germinating the seed, and this has the advantage of inducing more uniform sprouting and germination. This makes it possible to adjust weed-killing which can be carried out specifically around individual seeds and cultivated plants. The fluid-pulse also promotes continuous cleaning of the intermediate storage station.

The sowing device for the implementation of the method is characterized, according to the invention in that it is set up to trap and release individual seeds. It comprises an axial, substantially enclosed housing and, for the purpose of centering the individual seed in relation to the axis of the housing according to the release device, it is made funnel-shaped. The funnel-shaped part of the housing may be moved to one position in which it traps and retains the individual seed and, selectively, to a second position in which it releases the individual seed. A pulsating fluid-source is connected to the housing of the device.

It is important that the device for trapping and releasing be set up, not for several seeds simultaneously or consecutively, but for only a single seed. This makes it possible to store the single seed spot-wise in an accurately determined place. This takes place in an axial, substantially enclosed housing so that the seed can be reliably stored intermediately in this housing and cannot jump out laterally. This housing must, of course, be connected to the guide-device, e.g. the downpipe whence the individual seed is carried after the separating device. It is particularly important for the lower end of the housing to be funnel-shaped, with the tip pointing downwardly in the direction of release. This funnel-shaped design is intended to imply a design tapering downwardly in any way which may consist of a truncated cone, a truncated pyramid, or a tubular section, or the like, narrowing down in diameter. The lower end of the funnel may be open or closed. If an opening is provided, it must naturally be smaller than the individual seed so that the latter is trapped at this location and can thus be stored intermediately. In its initial position, the funnel-shaped part of the housing is designed in such a manner that it traps the individual seed, centers it and always keeps it in the same place. In the second position, in which the funnel-shaped part of the housing is either controlled independently or is guided by the fluid-pulse, the individual seed is accelerated from the same place. By using solenoid-valves, for example, a fluid-pulse of this kind may be set to extremely accurate intervals, thus considerably improving the accuracy of the spacing between the seeds.

It is particularly advantageous if the funnel-shaped part of the housing can be actuated by the pulsating fluid-source in both positions. In this case, separate control and movement of the funnel-shaped part of the housing may be dispensed with. The funnel-shaped part of the housing must either consist of a plurality of rigid but movably mounted parts, or it must be resiliently flexible as a whole, for example like a truncated-conical funnel made of rubber or the like.

The housing of the device for trapping and releasing individual seeds may be substantially cylindrical, with the axis of the cylinder running in the direction of release. In this connection, the cylindrical housing comprises an opening which allows the seed to pass out of the guide-device. Connected to the upper end of the housing is the fluid source, while the funnel-shaped intermediate storage location is arranged in the lower part. The axis of the cylindrical housing thus determines the direction of release. It is quite possible to adapt the axis of the housing to the rate of travel and to change its inclination accordingly, so that the individual seed is finally accelerated vertically downwardly into the furrow. Generally speaking, gravity ensures that the individual seed reaches the cylindrical housing through the guide-device and is centered spot-wise.

Chronological differences, arising when the seed is placed in the position of rest, i.e. in intermediate storage, are not detrimental to the spacing of the seeds since they are compensated for by the accurately controllable, intermittent fluid-pulse. All that is necessary to ensure that the release-velocity of the separating device and the rhythm of the fluid-pulse are in synchronism, so that a new seed can reach the position of rest through the guide-device precisely when the fluid-pulse is interrupted.

In the vicinity of the connection of the fluid-source, the housing of the device for trapping and releasing may comprise a solenoid-valve and a nozzle for producing the short-term fluid-pulses. The timing of the fluid-pulses can be controlled very accurately with such solenoid-valves. A specific flow is provided through a nozzle, so that identical acceleration-conditions are provided for the spot-wise intermediately stored and aligned seed.

The funnel-shaped intermediate storage station may comprise wall parts which are mounted to be resiliently flexible or pivotable under pressure, or a wall of this kind. The funnel-shaped wall, or wall parts, may consist of pieces of metal arranged in a pyramid, of a tubular rubber element, of pieces of wire or fabric, or the like, and of a return spring, e.g. a rubber ring. Return of the funnel-shaped wall parts to the closing or trapping position may be effected solely by the force of a weight, or by the use of springs.

The funnel-shaped wall or wall-parts are preferably replaceable in the device for trapping and releasing, on the one hand to allow for possible wear and, on the other hand, to allow for adaptation to the size and type of seed.

A control-device to synchronize the separating device, on the one hand, and the device for trapping and releasing the individual seed, on the other hand, is provided in order to adapt the operating speeds of the various units to each other. The device may be designed for the chronologically variable release of fluid pulses, the variation naturally operating only within the spacing of the separating device. It is, however, quite possible to obtain two different seed spacings following each other consecutively in a row, even if the separating device operates at constant spacing.

The separating device preceding the device for trapping and releasing individual seeds may be driven by a stepping motor controlled by the control device, to ensure that the separating device delivers the individual seeds correctly timed.

In the vicinity of the funnel-shaped wall, or preceding it, the housing of the device for trapping and releasing may comprise a constriction, in order to form the flow of the fluid specifically at this location.

The invention is explained in greater detail in conjunction with the example of embodiment illustrated in the drawing attached hereto, wherein.

Figure 1:
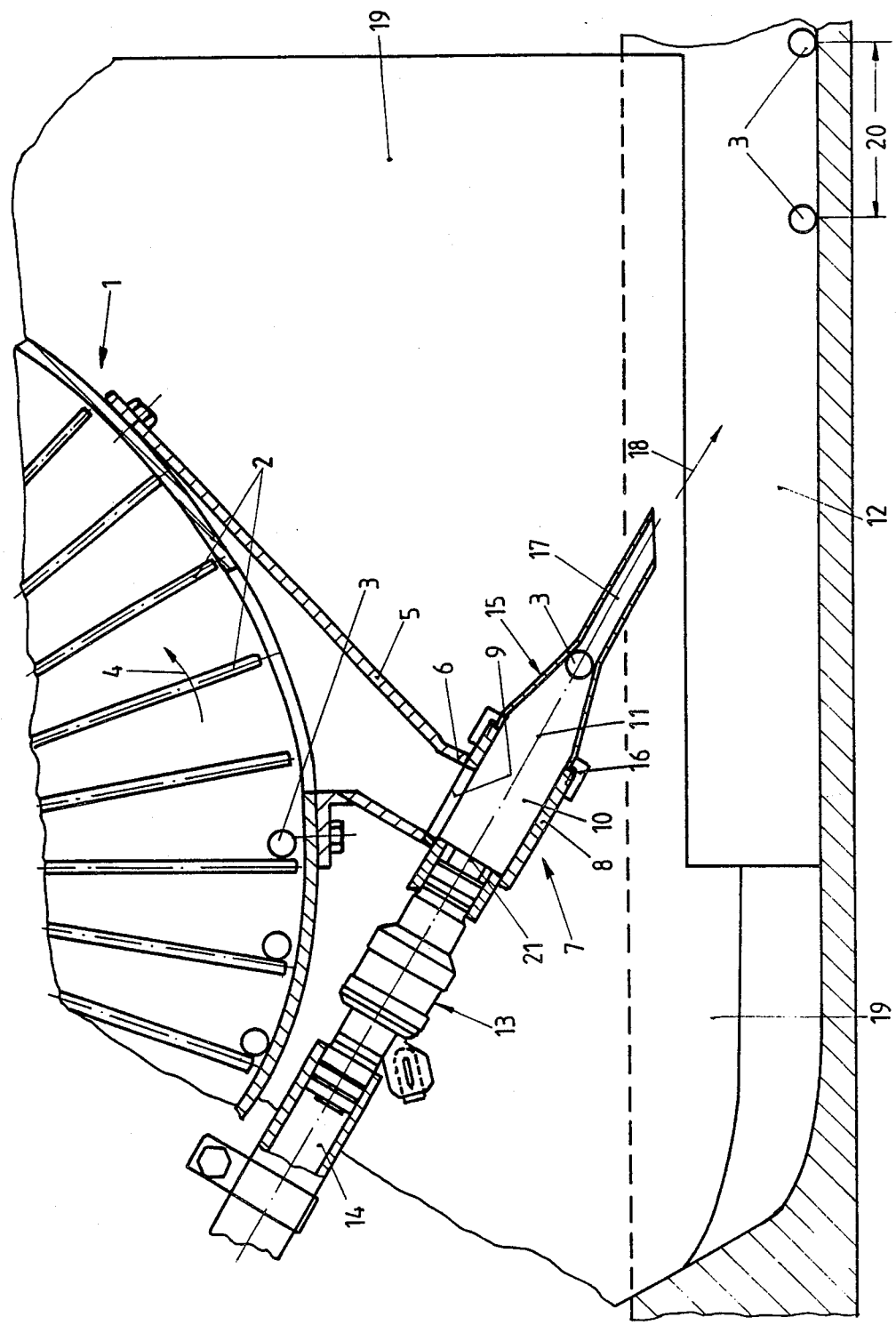
FIG. 1 is a vertical section through the essential parts of the apparatus.

Although the drawings always show only a single sowing unit, it is to be understood that a sowing machine may also be provided with a plurality of such sowing units staggered in relation to each other side by side and/or one behind the other. A machine of this kind may be used for sowing corn, beans, sugar-beets, wheat or the like. Even mixed sowing of seeds of different kinds is possible, each sowing unit being, of course, intended only for seeds of the same kind.

Each sowing unit comprises a separating device which may be of any desired design, for example a cellular wheel 2. It is essential for individual seeds 3 to be available separately if the cellular wheel is driven according to arrow 4. The individual seed is timed to reach a release station in the separating device to which a guide device 5 is connected, usually in the form of a downpipe. Provided at lower end 6 of guide-device 5 is a device 7 for trapping and releasing the individual seed. This consists essentially of a cylindrical housing 8 having a laterally arranged opening 9 allowing the individual seed 3 to pass from guide device 5 to the interior 10 of the cylindrical housing. The latter is arranged with its axis 11 in the direction of release of the individual seed into furrow 12. The angle of this release-device, and thus that of axis 11, may be altered and may be adjusted to the operating speed of the sowing machine. Connected to the upper end of housing 8, through an electrically controllable injection-valve 13, is a fluid-line 14 containing a fluid, i.e. air or a liquid, under pressure. Thus intermittent fluid pulse can be released into housing 8 through the injection valve. The lower end area of housing 8 is equipped with funnel-shaped wall parts 15 or with a funnel-shaped wall which tapers downwardly in the direction of ejection where it may be designed to be open or closed.

In FIG. 1, a funnel-shaped wall part 15 of this kind, made of rubber or of an elastomeric material, is shown. The funnel-shaped wall part is connected with housing 8 through a coupling ring 16 and comprises, in the direction of release, an opening 17 the diameter of which is smaller than that of the individual seed 3. The lower end of funnel-shaped wall part 15 could also be designed with an ability to open but could otherwise be closed, for instance by providing a slotted opening. What is essential is that funnel-shaped wall part 15 and axis 11 be arranged in relation to each other in such a manner that that individual seed 3 can drop from guide device 5 into the interior 10 of housing 8 and is then deposited, by gravity, at the lower end of funnel-shaped wall 15, in a specific position of rest in which it always rests in the same place, centered in relation to axis 11. By timing injection valve 13, a fluid pulse is applied, in the direction of axis 11, to individual seed 3 in the position of rest, whereby the seed is accelerated from its centered position of rest. At this time, funnel-shaped wall 15 opens or becomes larger in diameter, so that the individual seed is accelerated, or rather shot, in the direction of arrow 18, i.e. in the direction of axis 11, into the furrow. At the end of the fluid pulse, funnel-shaped wall 15 is returned to its position of rest, for example by the restoring force of the rubber funnel, so that it is again ready to trap the next seed delivered by separating device 1 and to deposit it in the position of rest, centrally at the end of the funnel, for the purpose of intermediate storage. It is to be understood that the release velocity of individual seeds from separating device 1, and the timing of the fluid pulses from injection valve 13, must be matched so that only one seed is ever stored intermediately and is then discharged from funnel-shaped wall part 15 before a second seed drops into the interior 10 of housing of device 7.

As may be seen, funnel-shaped wall 15 is arranged replaceably in housing 8 so that it can be exchanged for a wall of a different design and size and may thus be adapted to the type and size of seed to be sown. Axis 11 may preferably be matched with the component of movement of the individual seed and inclined in such a manner that the individual seed is accelerated away perpendicularly in relation to furrow 12 made by ploughshare 19. As may be seen, device 7 is arranged in the vicinity of ploughshare 19, so that individual seeds are ejected from their position of rest into funnel-shaped wall 15 from a relatively low height. Spacing 20 between the seeds in the row can thus be reproduced extremely accurately and this is what matters in the end.

Embedding of the individual seed, and closing of the soil, are improved with this apparatus and germinating conditions are therefore comparatively favourable. This is particularly so if the fluid used is a liquid under pressure which contains, in addition to water, a nutrient solution or some other treatment agent. Water or a nutrient solution of the order of about 0.2 to 1 $cm^3$ per individual seed may be applied by spraying.

At the connection to injection valve 13 in particular, housing 8 of device 7 may be provided with a nozzle 21, or it may be designed as a nozzle. Other constrictions may also be provided in housing 8 for the purpose of influencing the flow. It is important that, at each fluid pulse through the centered deposit of the seed, identical initial conditions be provided for the acceleration of the individual seed.

Figure 2:
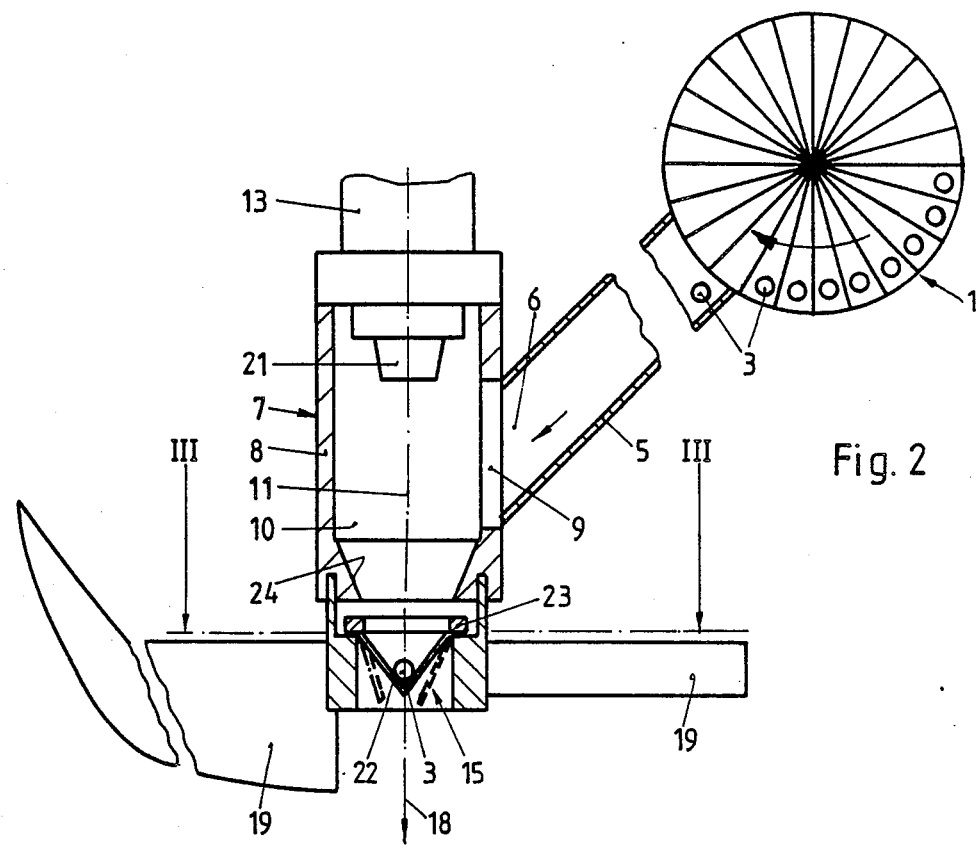
FIG. 2 is a vertical section through the device for trapping and releasing the individual seed, in a second example of embodiment.
Figure 3:
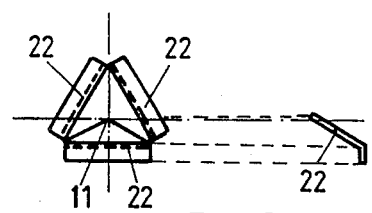
FIG. 3 is a section along the line III-III in the plan view of the funnel-shaped wall parts.
Figure 6:
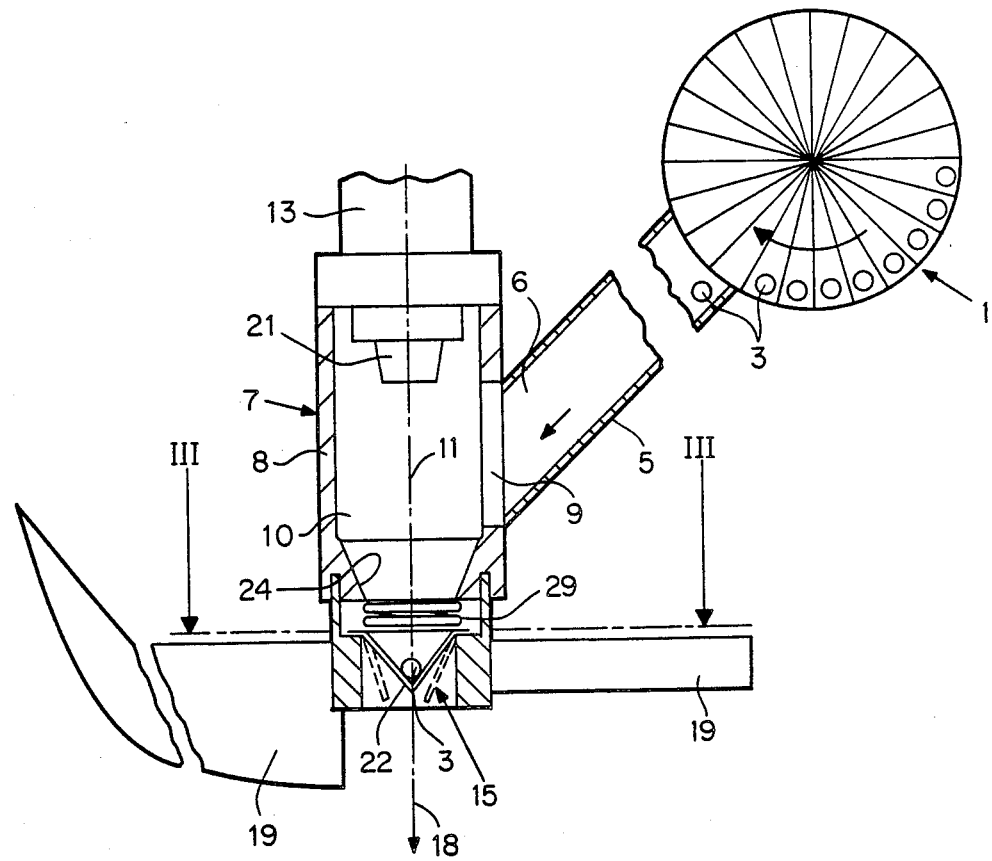
FIG. 6 is a schematic view of another embodiment of FIG. 2 with a spring in place of a weight ring.

FIG. 2 shows another example of the essential parts of the apparatus, as a rule only axis 11 being arranged vertically. In this case, the funnel-shaped wall is in the form of a three sided truncated pyramid (see also FIG. 3) and is thus made of three pieces of sheet metal 22 which form a pyramid closed at the bottom (in the position of rest) and each of which is bent. In the position of rest, they are loaded with a weight ring 23 and are returned to this closed position of rest as soon as the fluid pulse is interrupted. Conversely, this funnel-shaped wall 15 is open by tilting the pieces of sheet metal 22 when the fluid pulse is in action, as shown in dotted lines in FIG. 2. It is to be understood that a helical spring 29 may be provided instead of weight ring 23 (FIG. 6). The lower part of housing 8 contains a constriction 24 which affects the flow and prepares the funnel in wall 15 accordingly.

In the designs according to FIGS. 1 and 2, opening 9 in housing 8 may also be closed periodically by a controllable closure, for example a photographic shutter, in order to provide device 7 with a second position of rest. The closure may also be arranged in the vicinity of guide device 5, i.e. the downpipe. It is particularly suitable for long downpipes, as used for wheat in particular.

Figure 4:
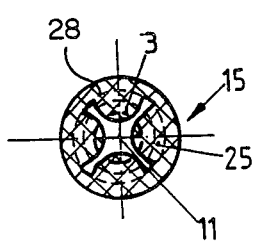
FIG. 4 is a view similar to that in FIG. 3 but of another example of the funnel-shaped wall parts.

FIG. 4 is a plan view of funnel-shaped wall 15, approximately in direction of line III-III in FIG. 2. In this case, wall 15 is stamped and formed out of wire netting which is sufficiently elastic to return to the position of rest, to trap the seed shown in dotted lines and to store it intermediately and, on the other hand, to open so that the individual seed is discharged by the fluid pulse. It is to be understood that wire netting 25 is funnel-shaped.

Figure 5:
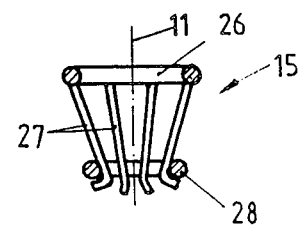
FIG. 5 shows another example of the funnel-shaped wall parts in vertical section.

FIG. 5 shows a vertical section through another example of funnel-shaped wall 15. Individual metal rods 27, which are resilient per se, are arranged in the shape of a funnel upon a mounting rings 26 and are held, or returned to, the position of rest, in the lower end area, by a rubber ring 28. As a result of the fluid pulse, this funnel-shaped wall 15 also carries out an opening movement, causing the rubber ring to expand or tauten so that individual seeds 3 are accelerated and can be ejected from device 7. At the end of the fluid pulse, rubber ring 28, acting as a return element, returns metal rods 27 to the funnel-shaped position shown. The metal rods may be made resilient per se or may be mounted so that they can move in ring 26.

Figure 7:
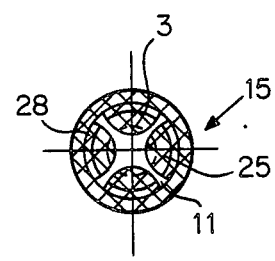
FIG. 7 is another embodiment of FIG. 4 with the addition of a rubber ring to increase resiliency.

FIG. 7 shows another embodiment of the arrangement of FIG. 4, with the rubber ring 28 added to increase resiliency.

The embodiments of the invention in which an exclusive property or privilege is claimed are defined as follows:

1. A sowing arrangement comprising: seed separating means; guide means and a ploughshare; means for trapping seeds moving in said guide means and for depositing the seeds in a furrow made by the ploughshare in the vicinity of an end of said guide means; said trapping means being set up for trapping and releasing the individual seeds and comprising; an axial substantially closed housing for centering the individual seeds in relation to an axis of the housing according to a predetermined direction of release; said housing having a funnel-shaped part adapted to move into a first position in which the individual seeds are trapped and retained; said funnel-shaped part being adapted to move into a second position for releasing the individual seeds, and a fluid source driven pulsatingly and connected to said housing for releasing the individual seeds into the furrow at constant sowing spacing; said funnel-shaped part of said housing being actuated by said fluid source in both said positions; said housing for trapping and releasing the individual seeds having a substantially cylindrical shape with a cylinder axis, said housing being aligned with said cylinder axis in the direction of release; said housing having laterally an aperture allowing seed to pass out of said guide means; said fluid source being connected to an upper end of said housing, said funnel-shaped part being arranged in a lower part of said housing; said funnel-shaped part comprising wall parts mounted to yield resiliently under pressure; said funnel-shaped wall parts comprising pyramidally-arranged metal elements and return spring means.

2. A method as defined in claim 1, wherein said fluid comprises air.

3. A method as defined in claim 1, wherein said fluid is a liquid containing water, a nutrient solution, protection against weeds and pests, innoculants, fertilizers, germination promoters and germination inhibitors.

4. A sowing arrangement as defined in claim 1, wherein said housing for trapping and releasing comprises further a solenoid valve for producing short term fluid pulses in vicinity of a connection to said fluid source.

5. A sowing arrangement comprising: seed separating means; guide means and a ploughshare; means for trapping seeds moving in said guide means and for depositing the seeds in a furrow made by the ploughshare in the vicinity of an end of said guide means; said trapping means being set up for trapping and releasing the individual seeds and comprising: an axial substantially closed housing for centering the individual seeds in relation to an axis of the housing according to a predetermined direction of release; said housing having a funnel-shaped part adapted to move into a first position in which the individual seeds are trapped and retained; said funnel-shaped part being adapted to move into a second position for releasing the individual seeds, and a fluid source driven pulsatingly and connected to said housing for releasing the individual seeds into the furrow at constant sowing spacing; said funnel-shaped part of said housing being actuated by said fluid source in both said positions; said housing for trapping and releasing the individual seeds having a substantially cylindrical shape with a cylinder axis, said housing being aligned with said cylinder axis in the direction of release; said housing having laterally an aperture allowing seeds to pass out of said guide means; said fluid source being connected to an upper end of said housing, said funnel-shaped part being arranged in a lower part of said housing; said funnel-shaped part comprising wall parts mounted to yield resiliently under pressure; said funnel-shaped parts comprising a wire member and return spring means.

6. A sowing arrangement as defined in claim 5, wherein said funnel-shaped wall parts are arranged replaceable on said housing for trapping and releasing.

7. A sowing arrangement as defined in claim 5, wherein said housing for trapping and releasing comprises a constriction in vicinity of said funnel-shaped part.

8. A sowing arrangement comprising: seed separating means; guide means and a ploughshare; means for trapping seeds moving in said guide means and for depositing the seeds in a furrow made by the ploughshare in the vicinity of an end of said guide means; said trapping means being set up for trapping and releasing the individual seeds and comprising: an axial substantially closed housing for centering the individual seeds in relation to an axis of the housing according to a predetermined direction of release; said housing having a funnel-shaped part adapted to move into a first position in which the individual seeds are trapped and retained; said funnel-shaped part being adapted to move into a second position for releasing the individual seeds, and a fluid source driven pulsatingly and connected to said housing for releasing the individual seeds into the furrow at constant sowing spacing; said funnel-shaped part of said housing being actuated by said fluid source in both said positions; said housing for trapping and releasing the individual seeds having a substantially cylindrical shape with a cylinder axis, said housing being aligned with said cylinder axis in the direction of release; said housing having laterally an aperture allowing seeds to pass out of said guide means; said fluid source being connected to an upper end of said housing, said funnel-shaped part being arranged in a lower part of said housing; said funnel-shaped part comprising wall parts mounted to yield resiliently under pressure; said funnel-shape parts comprising further fabric elements and return spring means.

9. A sowing arrangement comprising: seed separating means; guide means and a ploughshare; means for trapping seeds moving in said guide means and for depositing the seeds in a furrow made by the ploughshare in the vicinity of an end of said guide means; said trapping means being set up for trapping and releasing the individual seeds and comprising: an axial substantially closed housing for centering the individual seeds in relation to an axis of the housing according to a predetermined direction of release; said housing having a funnel-shaped part adapted to move into a first position in which the individual seeds are trapped and retained; said funnel-shaped part being adapted to move into a second position for releasing the individual seeds; and a fluid source driven pulsatingly and connected to said housing for releasing the individual seeds into the furrow at constant sowing spacing; said funnel-shaped part being actuated by said fluid source in said two positions; said housing having a substantially cylindrical shape with a cylinder axis, said housing being aligned with said cylinder axis in direction of release; said housing having laterally an aperture allowing seed to pass out of said guide means; said fluid source being connected to an upper end of said housing; said funnel-shaped part being arranged in a lower part of said housing; said housing having a solenoid valve for producing short term fluid pulses in vicinity of a connection of said fluid source; said funnel-shaped part comprising wall parts mounted to yield resiliently under pressure; said funnel-shaped wall parts comprising further pyramidally arranged metal elements and return spring means; said funnel-shaped wall parts being arranged replaceably on said housing; said housing having a constriction in vicinity of said funnel-shaped part.

* * * * *